Figure 1:
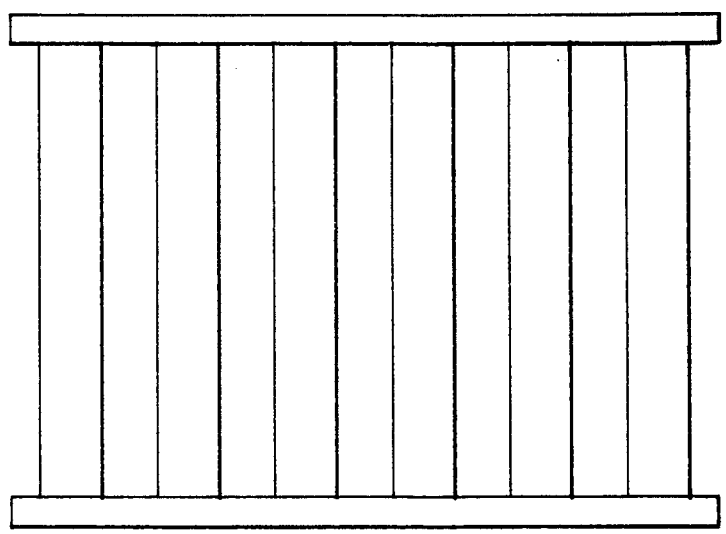

United States Patent [19]

Millgard

[11] Patent Number: 5,143,451
[45] Date of Patent: Sep. 1, 1992

[54] METHOD TO MEASURE A TEMPERATURE WITH A PELTIER ELEMENT

[75] Inventor: Lars O. A. Millgard, Ostersund, Sweden

[73] Assignee: Affarsverket FFV, Eskilstuna, Sweden

[21] Appl. No.: 704,840

[22] Filed: May 20, 1991

Related U.S. Application Data

[63] Continuation of Ser. No. 412,490, Sep. 26, 1989, abandoned.

[30] Foreign Application Priority Data

Sep. 29, 1988 [SE] Sweden .................. 8803459

[51] Int. Cl.$^5$ .......................................... G01N 25/04
[52] U.S. Cl. .................................. 374/25; 374/16; 374/178
[58] Field of Search .................. 374/16, 25, 178

[56] References Cited

U.S. PATENT DOCUMENTS 3,305,851 2/1967 Brandtszteter ............... 340/581
4,383,770 5/1983 Boschung et al. .............. 374/25
4,639,883 1/1987 Michaelis ..................... 364/557
4,657,409 4/1987 Wiggin et al. ................. 374/25

FOREIGN PATENT DOCUMENTS 0045106 2/1982 European Pat. Off. ......... 374/25

Primary Examiner—William A. Cuchlinski, Jr.
Assistant Examiner—W. Morris Worth
Attorney, Agent, or Firm—Fleit, Jacobson, Cohn, Price, Holman & Stern

[57] ABSTRACT

The present invention relates to a method to determine the temperature of one or both surfaces of the two surfaces of a Peltiér element. One then calculates the temperature difference (dT) between the surfaces from a known relation for the Seebeck voltage ($U_p$) as a function of the temperature difference and the mean temperature ($T_i$) of the element from a known relation for the temperature dependence of the internal resistance ($R_i$) of the element. Finally, to the mean temperature ($T_i$) one adds and from it subtracts respectively half the temperature difference (dT) between the surfaces.

12 Claims, 1 Drawing Sheet

METHOD TO MEASURE A TEMPERATURE WITH A PELTIER ELEMENT

This application is a continuation of application Ser. No. 07/412,490, filed Sep. 26, 1989 now abandoned.

The present invention relates to a method to measure a temperature with a Peltiér element. A Peltiér element is a thermoelectric element having two surfaces. If a temperature difference is maintained between the surfaces a current is generated, the Seebeck effect. This can be used to generate current or measure the temperature. Inversely one surface is heated and the other is cooled, if a current is conducted through the element, the Peltiér effect. This is among other things used to cool electronic equipment.

Today Peltiér elements usually consist of two heavily doped semiconductor blocks (usually bismuth telluride), which are connected electrically in series and thermally in parallel between the two surfaces of the element.

In the U.S. patent specification U.S. Pat. No. 4,639,883 a method to cool with a Peltiér element and calculate the temperature on one of its surfaces is given. The Seebeck potential is measured over the element in breaks in the current supply and the temperature difference across the element is determined in this way. In order to determine the temperature on the surface that is difficult to reach, but one would like to test, in the example given the cold surface, one measures the temperature on the other surface by means of an extra temperature sensor, for example a thermoelement, and is able to determine the temperature sought for from this and the temperature difference between the surfaces.

Thus this system requires an extra temperature sensor in addition to the Peltiér element, which can take up a great deal of space and is unnecessary expensive.

The present invention presents a method to measure a temperature, which does not require an extra temperature sensor in addition to a Peltiér element, by being drawn up in the way that is evident from the accompanying claim 1.

Figure 2:
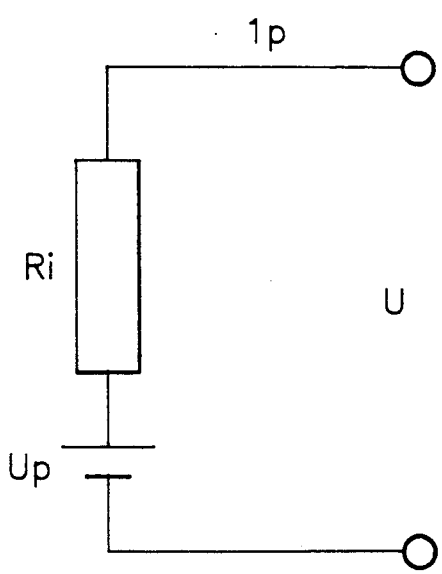

In the following the method according to the invention will be presented in greater detail with reference to the attached drawings where, FIG. 1 shows a schematic cross-section through a Peltiér element and FIG. 2 shows an equivalent electric circuit.

A Peltiér element has two surfaces having the temperatures $T_u$ and $T_l$. The element can in accordance with FIG. 2 be looked upon as a voltage source having the voltage $U_p$ in series with a internal resistance $R_i$. $U_p$ is the so called Seebeck voltage, which is a function of the temperature difference $dT = T_u - T_l$. It is possible to calculate dT from the relation $dT = a \cdot U_p + b \cdot U^2_p + c \cdot U^3_p + \ldots$ where the constants a, b, c ... for instance are determined by experiments.

The internal resistance $R_i$ is a function of the mean temperature $$T_i = \frac{T_u + T_l}{2}.$$

It is possible to determine $T_i$ from the relation $T_i = d + e \cdot R_i + f \cdot R^2_i + g \cdot R^3_i \ldots$ where the constants d, e, f, g ... for instance are determined by experiments.

According to the invention the temperature difference dT between the surfaces is calculated from the known relation for the Seebeck voltage $U_p$ as a function of the temperature difference dT and also the mean temperature $T_i$ from the known temperature dependance for the internal resistance $R^i$ of the element. Finally the temperature on one or both surfaces of the element is determined from the relations $R_u = T_i + dT/2$ and $T_l = T_i - dT/2$.

In one embodiment of the invention one measures directly the present Seebeck voltage $U_p$ as no current is applied to the element. Then a known direct current $I_p$ is fed to the element and the voltage U across the element that appears in this case is measured. The internal resistance in question is then calculated from the relation $$R_i = \frac{U - U_p}{I_p}.$$

The indicated way to measure a temperature can be combined with a way to cool or heat with the element, as in the cited American patent specification U.S. Pat. No. 4,639,883. In this case a current is fed to the element under a main part of the time, so that the surfaces of the element is cooled and heated respectively, and one interrupts the current supply during limited interruptions, during which the Seebeck voltage $U_p$ between the surfaces is measured.

In another embodiment of the invention both a direct current $I_p$, to cause a cooling or heating effect, and an alternating current i of low effect are fed to the element. The resulting voltage U across the element then consists of a continuous voltage component $U_{dc}$ and an alternating voltage component $U_{ac}$. If the Seebeck voltage is still called $U_p$ one gets the following relations:

$$U = U_{dc} + U_{ac}$$

$$U = U_p + I_p \cdot R_i + i \cdot R_i$$

$$U_{dc} = U_p + I_p \cdot R_i$$

$$U_{ac} = i \cdot R_i$$

By measuring the continuous voltage component $U_{dc}$ and the alternating voltage component $U_{ac}$ across the element it is possible to calculate the internal resistance $R_i$ and the Seebeck voltage $U_p$ from:

$$R_i = U_{ac}/i$$

$$U_p = U_{dc} - I_p \cdot R_i$$

One possible field of application or this method is the measurement of the freezing point for liquids, for instance in a layer intended to lower the freezing point on a road.

During the winter large quantities of salt are spread on the roads in order to reduce the risk for slipperiness and to facilitate the snow-clearence work. The salt lowers the freezing point for the moisture on the road so that the formation of ice is avoided. The freezing point depends on how high the concentration of salt is in the moisture on the road. The concentration of salt depends in its turn among other things upon the amount of precipitation and how many cars that have passed since the last spread of salt.

Spread of salt is an environmental problem and in addition it costs a lot of money. To minimize the spread of salt it is possible to use some sort of sensor that measures the present freezing point in the road surface. It is possible to use a sensor according to the invention, that is placed in the road in such a way that the upper surface of the Peltiér element is brought into thermal contact with the moisture on the road, in the same time as the lower surface is brought into thermal contact with the ground, possibly via a temperature equalizing plate.

The Peltiér element is fed with a direct current in alternating directions, which varies the temperature of the upper surface of the Peltiér element so that any liquid that occurs on the surface will freeze and melt alternately. The temperature of this surface can all the time be determined according to the invention.

For example in the European patent specification 45 106 it is stated how the temperature curve during the cooling, the so called solidification curve, at first drips, then quickly rises and then runs horizontally for some time, after which it drops again. The discontinuity at the freezing point can be detected by a microprocessor.

Another possible field of application for the invention is the cooling of electronics. Particularly optoelectronics have temperature depending characteristics, for instance the noise level for photodetectors and the wavelength of laser diodes. There is, then, in many cases a reason to cool these components in a controlled way. In certain cases it is possible to build a Peltiér element into the encapsulation of a semiconductor. In these cases it is an advantage if it is not necessary to take space and costs for an extra temperature sensor in accordance with the previously known method.

I claim:

1. A method for the purpose of determining the freezing point of a liquid comprising the steps of:
    bringing a surface of a Peltier element, having two surfaces and two lead terminals, into contact with a liquid, the freezing point of which is desired to be determined;
    feeding a known direct current through said Peltier element at first in one direction during a first interval of time, then in an opposite direction during a second interval of time so that said liquid is alternately heated and cooled;
    repeatedly determining the temperatures of both surfaces of said Peltier element during the first and second intervals by: detecting the voltage across said terminals as said current is applied;
    periodically interrupting said current to said Peltier element;
    measuring a Seebeck voltage of said Peltier element during said interruption;
    determining internal resistance of said Peltier element from values representing said supplied current, said detected voltage and said Seebeck voltage;
    calculating the existing means temperature of said Peltier element from said internal resistance;
    calculating the existing temperature difference between said surfaces of said Peltier element from said Seebeck voltage;
    computing the temperature of a first surface of said Peltier element by adding half of said temperature difference to said means temperature;
    computing the temperature of a second surface of said Peltier element by subtracting half of said temperature difference from said means temperature,
    generating a temperature curve from the temperatures determined for said surface brought into contact with said liquid, wherein the temperature curve so achieved in the vicinity of the freezing point is called the solidification curve;
    identifying a characteristic discontinuity in the solidification curve; and
    registering the temperature of said surface at the time of said discontinuity.

2. The method according to claim 1, in which the internal resistance of said Peltier element is determined according to $$R_1 = (U - U_p)/I_p$$

where $R_1$ is the internal resistance and $LU_p$ is the Seebeck voltage of said Peltier element, $I_p$ is the current supplied to said Peltier element, and U is the voltage detected across said terminals as said current is supplied.

3. The method according to claim 1, in which the mean temperature of said Peltier element is calculated according to $$T_1 = d + c^* R_1 + f^* R_1^2 + \ldots$$

where $T_1$ is the mean temperature of said Peltier element and d, c, f, ... are empirically determined constants valid for said Peltier element.

4. The method according to claim 1, in which the said temperature difference is calculated according to $$dT + a^* U_p + b^* U_p^2 + \ldots$$

where dT is the temperature difference between the two surfaces and $U_p$ is the Seebeck voltage of said Peltier element and where a, b, ... are empirically determined constants valid for said Peltier element.

5. The method according to claim 1, further comprising the step of measuring said Seebeck voltage during such limited interruptions in the current supply to the element, that the direct current creates a sufficient temperature difference between the surfaces of the element to allow the element to be used as a cooling and/or heating device.

6. The method according to claim 1, in which said second surface of the Peltier element is brought into contact with the ground and said first surface is brought into contact with a liquid covering said ground.

7. A method for the purpose of determining the freezing point of a liquid comprising the steps of:
    bringing a surface of a Peltier element having two surfaces and two lead terminals into contact with a liquid, the freezing point of which is desired to be determined;
    feeding a known alternating current through said Peltier element and feeding a known direct current through said Peltier element at first in one direction during a first interval of time, then in an opposite direction during a second interval of time so that said liquid is alternately heated and cooled;
    repeatedly determining the temperature of both surfaces of said Peltier element during the first and second intervals by: detecting the direct current and alternating current voltage components across said terminals as said currents are applied;
    determining the internal resistance of said Peltier element from values of said supplied alternating current and said detected alternating current voltage component;

calculating Seebeck voltage of said Peltier element from said detected direct current voltage, said supplied direct current and said internal resistance;

calculating existing means temperature of said Peltier element from said internal resistance;

calculating existing temperature difference between said surfaces of said Peltier element from said Seebeck voltage;

computing a temperature of a first surface of said Peltier element by adding half of said temperature difference to said means temperature, computing a temperature of a second surface of said Peltier element by subtracting half of said temperature difference from said means temperature generating a temperature curve from the determined temperatures wherein the temperature curve so achieved in the vicinity of the freezing point is called a solidification curve;

identifying a characteristic discontinuity in the solidification curve; and registering the temperature of said surface at the time of said discontinuity.

8. The method according to claim 7, in which the internal resistance of said Peltier element is determined according to $$R_1 = U_{ac}/i$$

where $R_1$ is the internal resistance, $U_{ac}$ is the alternating current voltage component detected across said terminals and i is the alternating current supplied to said terminals.

9. The method according to claim 7, in which the mean temperature of said Peltier element is calculated according to $$T_1 = d + c^*R_1 + f^*R_1^2 + \ldots$$

where $T_1$ is the mean temperature of said Peltier element and d, c, f, ... are empirically determined constants valid for said Peltier element.

10. The method according to claim 7, in which the Seebeck voltage is calculated according to $$U_p = U_{dc} - I_p^*R_1$$

11. The method according to claim 7, in which said temperature difference is calculated according to $$dT = a^*U_p + b^*U_p^2 + \ldots$$

where dT is the temperature difference between said two surfaces and $U_p$ is the Seebeck voltage of said Peltier element and where a, b, ... are empirically determined constants valid for said Peltier element.

12. The method according to claim 7, in which said second surface of the Peltier element is brought into contact with ground and said first surface is brought into contact with a liquid covering said ground.

* * * * *